(12) United States Patent
Benson et al.

(10) Patent No.: US 9,664,955 B2
(45) Date of Patent: May 30, 2017

(54) METHOD TO DESIGN THE INTEGRATED FULL COVERAGE LCD MODULE COVER GLASS

(71) Applicant: Apple Inc., Cupertino, CA (US)

(72) Inventors: Eric Lee Benson, San Francisco, CA (US); Bryan W. Posner, La Selva Beach, CA (US); Jun Qi, Cupertino, CA (US); Victor Hao-En Yin, Cupertino, CA (US); Christiaan A. Ligtenberg, San Carlos, CA (US); Dinesh C. Mathew, Fremont, CA (US); Adam T. Garelli, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 188 days.

(21) Appl. No.: 13/965,112

(22) Filed: Aug. 12, 2013

(65) Prior Publication Data

US 2014/0063433 A1 Mar. 6, 2014

Related U.S. Application Data

(60) Provisional application No. 61/694,194, filed on Aug. 28, 2013, provisional application No. 61/696,102, filed on Aug. 31, 2012.

(51) Int. Cl.
*G02F 1/1333* (2006.01)
*G02F 1/1341* (2006.01)

(52) U.S. Cl.
CPC ...... *G02F 1/1341* (2013.01); *G02F 1/133308* (2013.01); *G02F 2001/133331* (2013.01); *G02F 2201/503* (2013.01); *Y10T 156/1093* (2015.01)

(58) Field of Classification Search
CPC .......................................... G02F 2001/133331
See application file for complete search history.

(56) References Cited

U.S. PATENT DOCUMENTS 5,300,459 A * 4/1994 Ushikubo et al. ............ 438/126
5,583,681 A 12/1996 Shioya et al.
(Continued)

FOREIGN PATENT DOCUMENTS

JP 2011203757 10/2011
KR 2011094395 8/2011
(Continued)

OTHER PUBLICATIONS

PCT Application No. PCT/US2013/056047—International Search Report and Written Opinion dated Nov. 25, 2013.
(Continued)

*Primary Examiner* — Nathanael R Briggs
*Assistant Examiner* — Alexander Gross
(74) *Attorney, Agent, or Firm* — Downey Brand LLP (57) ABSTRACT

The described embodiments relate generally to liquid crystal displays (LCDs), and more particularly to methods for extending a glass portion of a display to an edge of a display housing. In one embodiment, a thin cover glass layer is provided between a color filter glass layer and an upper polarizer. The thin cover glass layer is supported along an edge of the display by a filler material that can include a foam dam and a glass spacer or adhesive filler. The filler material allows the cover glass layer to be supported without damaging any drivers or circuits located on an underlying thin film transistor glass layer. In another embodiment, a glass spacer circuit with integrated drivers and circuitry on its lower surface can support the cover glass along the edge of the display.

20 Claims, 6 Drawing Sheets

(56) References Cited

U.S. PATENT DOCUMENTS

| | | |
|---|---|---|
| 6,177,971 B1 | 1/2001 | Jung et al. |
| 8,289,466 B2 | 10/2012 | Matsuhira et al. |
| 2005/0062899 A1 | 3/2005 | Fukayama et al. |
| 2006/0176417 A1 | 8/2006 | Wu et al. |
| 2008/0266273 A1* | 10/2008 | Slobodin et al. ............. 345/174 |
| 2009/0268147 A1* | 10/2009 | Tang et al. ................... 349/151 |
| 2010/0220072 A1* | 9/2010 | Chien et al. .................. 345/173 |
| 2010/0315570 A1* | 12/2010 | Mathew et al. ................. 349/58 |
| 2011/0109829 A1* | 5/2011 | Mathew et al. ................. 349/58 |
| 2011/0165393 A1* | 7/2011 | Bayne et al. ................. 428/215 |
| 2011/0199348 A1* | 8/2011 | Takatani ............. G02F 1/13452<br>345/204 |
| 2011/0242655 A1* | 10/2011 | Jung .................. G02F 1/13338<br>359/488.01 |
| 2012/0020000 A1 | 1/2012 | Mathew et al. |
| 2012/0087065 A1 | 4/2012 | Kim et al. |
| 2012/0235948 A1* | 9/2012 | Inoue et al. ................. 345/173 |

FOREIGN PATENT DOCUMENTS

| | | |
|---|---|---|
| KR | 10-1071138 | 10/2011 |
| TW | 200628909 | 8/2006 |
| WO | 2007081098 | 7/2007 |
| WO | WO 2011070884 A1 * | 6/2011 |

OTHER PUBLICATIONS

Taiwanese Patent Application No. 102130669—Office action dated Jul. 16, 2015.

\* cited by examiner

FIG. 6

METHOD TO DESIGN THE INTEGRATED FULL COVERAGE LCD MODULE COVER GLASS

CROSS REFERENCE TO RELATED APPLICATIONS

This application claims the benefit of U.S. Provisional Application No. 61/694,194, filed Aug. 28, 2012 and entitled "METHOD TO DESIGN THE INTEGRATED FULL COVERAGE LCD MODULE COVER GLASS", and U.S. Provisional Application No. 61/696,102, filed Aug. 31, 2012 and entitled "METHOD TO DESIGN THE INTEGRATED FULL COVERAGE LCD MODULE COVER GLASS", both of which are incorporated herein by reference in their entirety for all purposes.

FIELD OF THE DESCRIBED EMBODIMENTS

The described embodiments relate generally to liquid crystal displays (LCDs), and more particularly to methods for extending a glass portion of a display to an edge of a display housing.

BACKGROUND

Liquid crystal display (LCD) modules are commonly used in a variety of consumer electronics devices including televisions, computer monitors, laptop computers and mobile devices. A typical LCD module can include a backlight, liquid crystal cell, and electronics. A liquid crystal cell can further include a thin film transistor (TFT) glass layer, a color filter (CF) glass layer, and two polarizers. At least one edge of a LCD module can include electronics used to drive signals to circuits that control individual pixels. These electronics can include integrated chips and flexible printed circuits mounted on the TFT glass layer. The thickness of these electronics can exceed the space that is available between the TFT glass layer and the CF glass layer. Therefore, design constraints can require the TFT glass layer to extend beyond the CF glass layer along an edge of the LCD module, creating an area referred to as a TFT ledge.

Many designs can require that the TFT ledge be covered and protected from a user of the device. Two conventional methods are commonly used as a means of protecting the TFT ledge. First, a trim ring or protective bezel can be installed over the LCD module in an area covering the TFT ledge. While effective, this solution can add unwanted thickness to the device and can be less aesthetically pleasing than a uniform piece of glass extending to the edge of the LCD module. Alternatively, an additional piece of cover glass can be placed in front of the LCD module with printing around the border to hide the TFT ledge from the user. Unfortunately, this can also increase the thickness of the device. Moreover, the use of cover glass can increase the level of reflectance from the device, leading to glares that can decrease the overall user experience.

Therefore, what is desired is a method for extending a cover glass layer to the edge of the LCD module while protecting the TFT ledge and minimizing any increases in overall thickness or reflectance.

SUMMARY OF THE DESCRIBED EMBODIMENTS

The present disclosure generally relates to a method for extending a glass surface of an LCD module to an edge of an LCD housing. LCD module designs can include an area where a color filter (CF) glass layer does not extend to an edge of the LCD module in order to accommodate chips on glass (COG), metal traces, and flexible printed circuitry that can be mounted to an underlying thin film transistor (TFT) glass layer. This can create a region referred to as a TFT ledge that must be covered to protect and hide the COG and metal traces from a user of the device. The TFT ledge can be hidden by providing a thin cover glass layer on an upper surface of the LCD module or between the CF glass layer and a top polarizer.

Devices containing LCD modules can have design restraints which restrict the available space for the LCD module. This can lead to designs in which components of the LCD module, including the cover glass layer, are configured to be as thin as possible. However, a thin cover glass layer can be structurally weak, creating a risk that the cover glass layer may damage the electronics included on the TFT ledge if deflected downwards. Therefore, structures can be provided to support the cover glass layer without increasing the thickness of the LCD module. In one embodiment, a foam support and a filler can be used to support the cover glass layer above the TFT ledge. The filler can include an adhesive fill, a glass spacer, or any other suitable material. The foam and filler can support the cover glass layer while protecting the COG and metal traces overlaid on the TFT layer. In another embodiment, the COG can be mounted to a glass spacer circuit instead of the TFT layer. The glass spacer can act as both a spacer to support the cover glass (CG) layer and as an electrical circuit to connect the COG signals to traces on the TFT glass layer.

In one embodiment, a liquid crystal display (LCD) module with cover glass that extends to an edge of the LCD module is disclosed. The LCD module includes a first glass substrate overlaid with a color filter, a second glass substrate disposed below and in contact with the first glass substrate, and a cover glass layer disposed above the first glass substrate. The second glass substrate includes a liquid crystal layer and extends past an edge of the first glass substrate. The cover glass layer is configured to extend to the edge of the LCD module. The LCD module also includes at least one circuit coupled to an upper surface of the second glass substrate in an area extending past the edge of the first glass substrate, and a filler material disposed between the second glass substrate and the cover glass layer. The filler material is configured to fill a cavity created by a lower surface of the cover glass layer, the upper surface of the second glass substrate, and the edge of the first glass substrate. In one embodiment, the filler material includes a foam dam and a glass spacer. In one embodiment, the filler material includes a foam dam and an adhesive fill. In one embodiment, the filler material includes one of the following materials: a foam dam, a glass spacer, and an adhesive fill. In one embodiment, the LCD module includes a top polarizer disposed above and in contact with the cover glass layer. In one embodiment, the LCD module includes a top polarizer disposed between the cover glass layer and the first glass substrate.

In one embodiment, a liquid crystal display (LCD) module with cover glass that extends to an edge of the LCD module is disclosed. The LCD module includes a first glass substrate overlaid with a color filter, a second glass substrate disposed below and in contact with the first glass substrate, and a cover glass layer disposed above the first glass substrate. The second glass substrate includes a liquid crystal layer and extends past an edge of the first glass substrate. The cover glass layer is configured to extend to the edge of the LCD module. The LCD module also includes a glass spacer circuit disposed between the second glass substrate and the cover glass layer, and at least one circuit coupled to a lower surface of the glass spacer circuit in an area extending past an edge of the second glass substrate. The glass spacer circuit is configured to fill a cavity created by a lower surface of the cover glass layer, an upper surface of the second glass substrate, and the edge of the first glass substrate. In one embodiment, an upper surface of the glass spacer circuit is aligned with an upper surface of the first glass substrate to provide a uniform planar surface for bonding to the cover glass layer. In one embodiment, the upper surface of the glass spacer circuit and the upper surface of the first glass substrate is bonded to the cover glass layer using an optically clear adhesive (OCA). In one embodiment, the at least one circuit comprises a chip on glass (COG) and a flexible printed circuit. In one embodiment, the second glass substrate further includes a thin film transistor (TFT) glass layer. In one embodiment, a metal trace disposed on the glass spacer circuit is configured to make contact with the thin film transistor (TFT) glass layer. In one embodiment, the glass spacer circuit is bonded to the second glass substrate using an anisotropic conductive film (ACF).

In one embodiment, a method for manufacturing a liquid crystal display (LCD) module with cover glass that extends to an edge of the LCD module is disclosed. The method includes the following steps: (1) providing a first glass substrate overlaid with a color filter, (2) bonding a second glass substrate to a lower surface of the first glass substrate, where the second glass substrate includes a liquid crystal layer and extends past an edge of the first glass substrate, (3) bonding at least one circuit to an upper surface of the second glass substrate in an area extending past the edge of the first glass substrate, (4) placing a filler material on the upper surface of the second glass substrate and the at least one circuit in the area extending past the edge of the first glass substrate, where the filler material is configured to include an upper surface that is coplanar with an upper surface of the first glass substrate, and (5) bonding a cover glass layer to the upper surface of the first glass substrate and the upper surface of the filler material, where the cover glass layer is configured to extend to the edge of the LCD module. In one embodiment, the filler material includes a foam dam and a glass spacer. In one embodiment, the filler material includes a foam dam and an adhesive fill. In one embodiment, bonding the cover glass layer to the upper surface of the first glass substrate and the upper surface of the filler material is performed using an optically clear adhesive (OCA). In one embodiment, the method further includes the step of bonding a top polarizer to an upper surface of the cover glass layer.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments may be better understood by reference to the following description and the accompanying drawings. Additionally, advantages of the described embodiments may be better understood by reference to the following description and accompanying drawings. These drawings do not limit any changes in form and detail that may be made to the described embodiments. Any such changes do not depart from the spirit and scope of the described embodiments.

DETAILED DESCRIPTION OF SELECTED EMBODIMENTS

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

LCD modules are being used in an increasing number of devices in the consumer electronics industry including computer monitors, laptop computers, mobile phones, handheld video game systems, navigation systems and televisions. LCD modules can include a laminated stack up of various layers. Typically, this stack up can include two glass substrates: a thin film transistor (TFT) glass layer and a color filter (CF) glass layer. Both layers can be overlaid with electronics to control the amount and color of light that is emitted from the LCD module. In addition, at least one edge of the TFT glass layer can include chips on glass (COG), metal traces, and flexible printed circuitry to send the signals to transistors overlaying the TFT glass layer. The COG can be thicker than the space available between the TFT glass layer and the CF glass layer. Thus, the TFT glass layer can often extend beyond the CF layer, creating a region known as the TFT ledge. Exposure of the TFT ledge can be undesirable so a variety of methods have been developed to cover the TFT ledge.

Many electronic devices can have design constraints that drive the LCD module be as thin as possible to avoid adding thickness to the device in which it is used. Furthermore, the user experience can be enhanced by creating the appearance that a layer of glass extends to an edge of a housing in which the LCD module is contained. Existing designs can have difficulty meeting both of these requirements. One common method of covering the TFT ledge is to provide a trim ring or bezel along the edge of the LCD module. However, this method does not allow for glass to extend to the edge of the device. Another method is to place a piece of cover glass over the top of the LCD module. This method can allow for glass to extend to the edge of the device, but can add substantial thickness to the device and can increase the amount of unwanted reflections off the display.

One solution to this problem is to provide a thin layer of cover glass that extends to the edge of the LCD module and a means for supporting the cover glass over the TFT ledge. The cover glass can be positioned between the CF glass layer and a top polarizer. Alternatively, the cover glass can be positioned above a top polarizer on an upper surface of the LCD module. By providing sufficient support, the cover glass can be thin enough that the overall thickness of the LCD module is not substantially increased. Moreover, placing the cover glass underneath the top polarizer can reduce the amount of unwanted reflections and glare. Several methods of providing support over the TFT ledge are disclosed. In one embodiment, a foam support and a filler can be used to support the cover glass layer above the TFT ledge. The filler can include an adhesive fill or a glass spacer. The foam and filler can support the cover glass layer while protecting the COG and metal traces overlaid on the TFT layer. In another embodiment, the COG can be mounted to a glass spacer circuit instead of the TFT layer. The glass spacer can act as both a spacer to support the cover glass (CG) layer and as an electrical circuit to connect the COG signals to glass traces on the TFT layer.

Figure 1A:
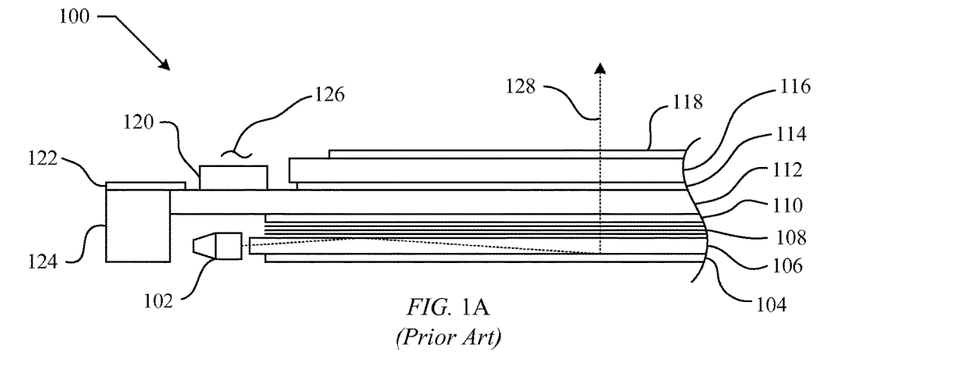
FIG. 1A shows a cross-section of a typical LCD module.

FIG. 1A shows a prior art cross-sectional view of a typical LCD module 100. Light can be emitted from LED (light emitting diode) 102 and distributed evenly across the module by reflector 104 and light guide 106. In one embodiment, light guide 106 can include many optical components such as a light guide plate (LGP). Next, light can pass through optical films 108 and bottom polarizer 110 before entering TFT glass layer 112. TFT glass layer 112 can be overlaid with a matrix of liquid crystals 114 held between transparent conductive layers to control the emission of light. Finally, light can pass through CF glass layer 116 and top polarizer 118 before leaving the LCD module. Path 128 shows a typical path for light to take through LCD module 100. TFT glass layer 112 can also be overlaid with COG 120. COG 120 can include driver integrated chips (ICs) and traces to drive signals from the drivers to individual transistors within liquid crystal matrix 114. In addition, flexible printed circuit (FPC) 122 can be partially overlaid on TFT glass layer 112 and used to transmit signals from a corresponding circuit board to COG 120. COG 120 can be thicker than the gap between TFT glass layer 112 and CF glass layer 116. In order to avoid an interference, it can be necessary for TFT glass layer 112 to extend beyond CF glass layer 116 at an edge of the LCD module. This can create a region known as TFT ledge 126 between the edge of CF glass layer 116 and LCD module housing 124. It can be advantageous to cover TFT ledge 126 so that the COG are hidden and protected from a user of the device.

Figure 1B:
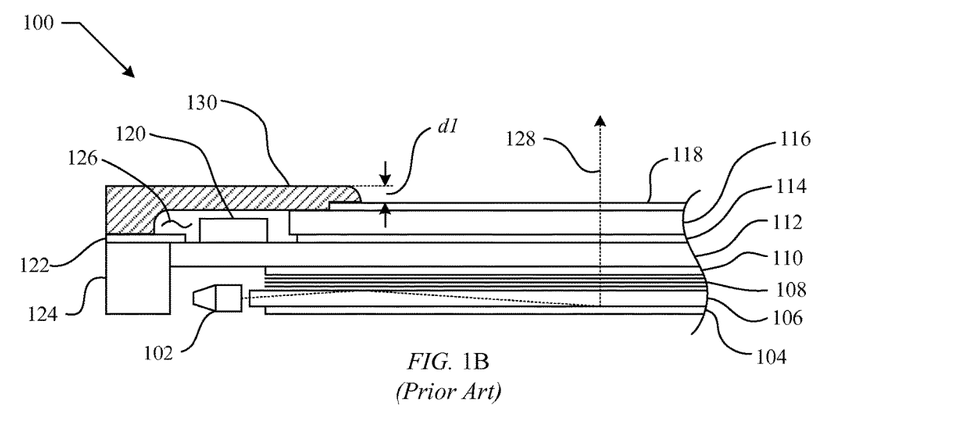
FIG. 1B shows a cross-section of an LCD module in which the TFT ledge has been covered using a conventional cosmetic trim or bezel design.

FIG. 1B shows a prior art embodiment of LCD module 100 in which bezel 130 is used to cover TFT ledge 126. Bezel 130 can be provided to cover TFT ledge 126 and can transmit any loads to housing 124 and CF glass layer 116. However, there can be several disadvantages to using this method. First, bezel 130 can add additional thickness d1 to the device. Design requirements can drive LCD module 100 to be as thin as possible. This can be particularly true in devices such as mobile phones and laptop computers that are designed to be portable. Using bezel 130 can result in an increase to the overall thickness of the device. In addition, users can consider designs in which a glass layer extends to an edge of a device to be more aesthetically pleasing. The placement of bezel 130 along the edge of LCD module 100 can block a user from viewing any underlying glass layers, preventing the design from having the appearance that glass extends to the edge of the device.

Figure 1C:
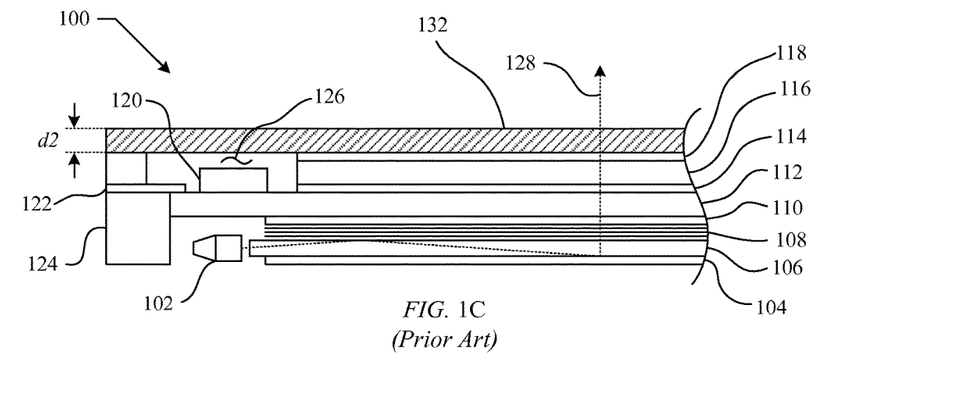
FIG. 1C shows a cross-section of an LCD module in which the TFT ledge has been covered using a conventional cover glass layer.

FIG. 1C shows another prior art embodiment of LCD module 100 in which a layer of cover glass is used to cover TFT ledge 126. Cover glass 132 can be placed over LCD module 100, extending over TFT ledge 126 to rest on housing 124. Cover glass 132 can have printing around the border to hide TFT ledge 126 from the user. However, there can be several disadvantages to using this method as well. First, cover glass 132 can add distance d2 to the thickness of the LCD module. Cover glass 132 must be robust enough to transmit any load applied over TFT ledge 126 to CF glass layer 116 and housing 124. The inclusion of cover glass with sufficient thickness d2 to transmit the loads can result in a significant increase in the overall thickness of LCD module 100. Secondly, the inclusion of an outer layer of cover glass can increase the level of reflectance in the system. This can result in glares that decrease the overall user experience.

Figure 2:
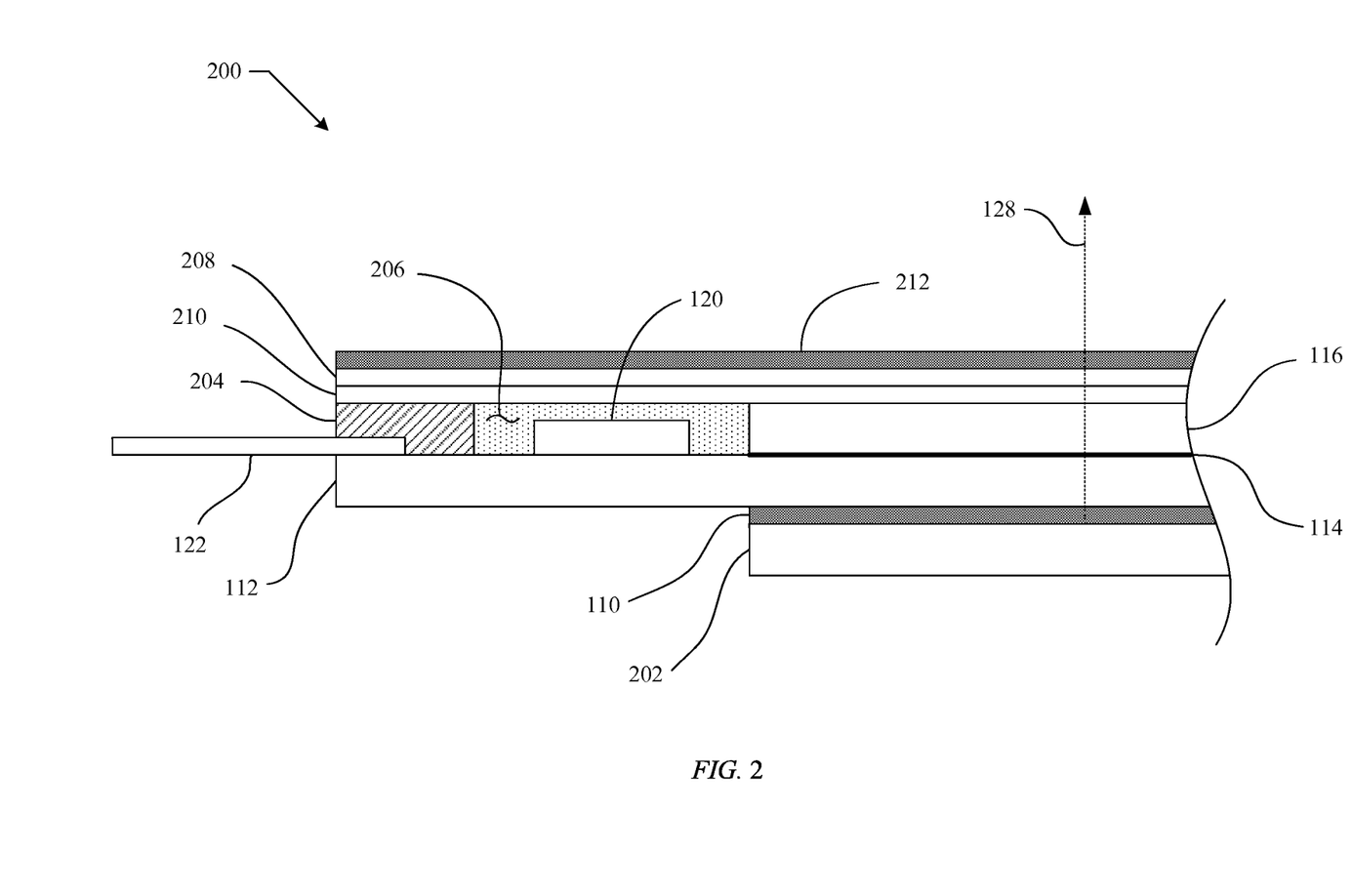
FIG. 2 shows a cross section of an LCD module where a thin layer of cover glass is supported over the TFT ledge using foam and filler material.

FIG. 2 shows a cross-sectional view of an LCD module 200 in which a glass surface can extend to an edge of LCD module 200 without substantially increasing overall thickness or reflectance. LCD module 200 can include backlight assembly 202, bottom polarizer 110, TFT glass layer 112, liquid crystal layer 114, and CF glass layer 116. In one embodiment, backlight assembly 202 can include a light source such as LED (light emitting diode) 102, a light guide 106, a reflector 104, optical films 108, and mechanical structures. LCD module 200 can also include a cover glass layer 208 located between CF glass layer 116 and top polarizer 212. Cover glass layer 208 can include black mask printing to hide the TFT ledge from the user and can be laminated to CF glass layer 116 using an optically clear adhesive (OCA) 210. In another embodiment, top polarizer 212 can be laminated to CF glass layer 116 and cover glass layer 208 can be positioned above top polarizer 212. In other words, in another embodiment, top polarizer 212 can be disposed to be between CF glass layer 116 and cover glass layer 208. In one embodiment, the thickness of cover glass 208 can be as little as about 0.1 mm, and the thickness of optically clear adhesive (OCA) 210 can also be as little as about 0.1 mm. Thus, the resulting increase in thickness of LCD module 200 can be considerably less than distances d1 and d2 shown in FIG. 1B and FIG. 1C respectively. Moreover, the placement of cover glass layer 208 underneath top polarizer 212 can reduce the reflectance of the screen. This can provide a better user experience and eliminate the need for anti-reflective coatings on an outer glass surface that may not be robust enough for portable applications. Finally, the design can allow cover glass 208 to extend over TFT ledge 126 and reach the edge of LCD module 200, resulting in cleaner and more aesthetic design.

Various structures can be provided to mechanically support cover glass 208 over TFT ledge 126. In one embodiment, foam dam 204 can be placed along the edge of LCD module 200 to support cover glass 208 and protect flexible printed circuit 122. Foam dam 204 can be made from an EMI (electromagnetic interference) shielding material or any other suitable material. In addition, filler 206 can be included in an area surrounding COG 120. Filler 206 can be made from a variety of different materials. In one embodiment, filler 206 can be made from a glass spacer that has been shaped to fill the area between TFT glass layer 112 and cover glass 208. In another embodiment, filler 206 can represent an adhesive fill that can be injected into the TFT ledge. It is not necessary for both foam dam 204 and filler 206 to be present. In another embodiment, filler 206 can extend to the edge of LCD module 200, eliminating the need for foam dam 204. In yet another embodiment, foam dam 204 can be shaped to cover COG 120 and extend to the edge of CF glass layer 116. Once in place, foam dam 204 and filler 206 can prevent the COG and other electronics on TFT glass layer 112 from being damaged when pressure is applied to cover glass 208 above the TFT ledge.

Figure 3:
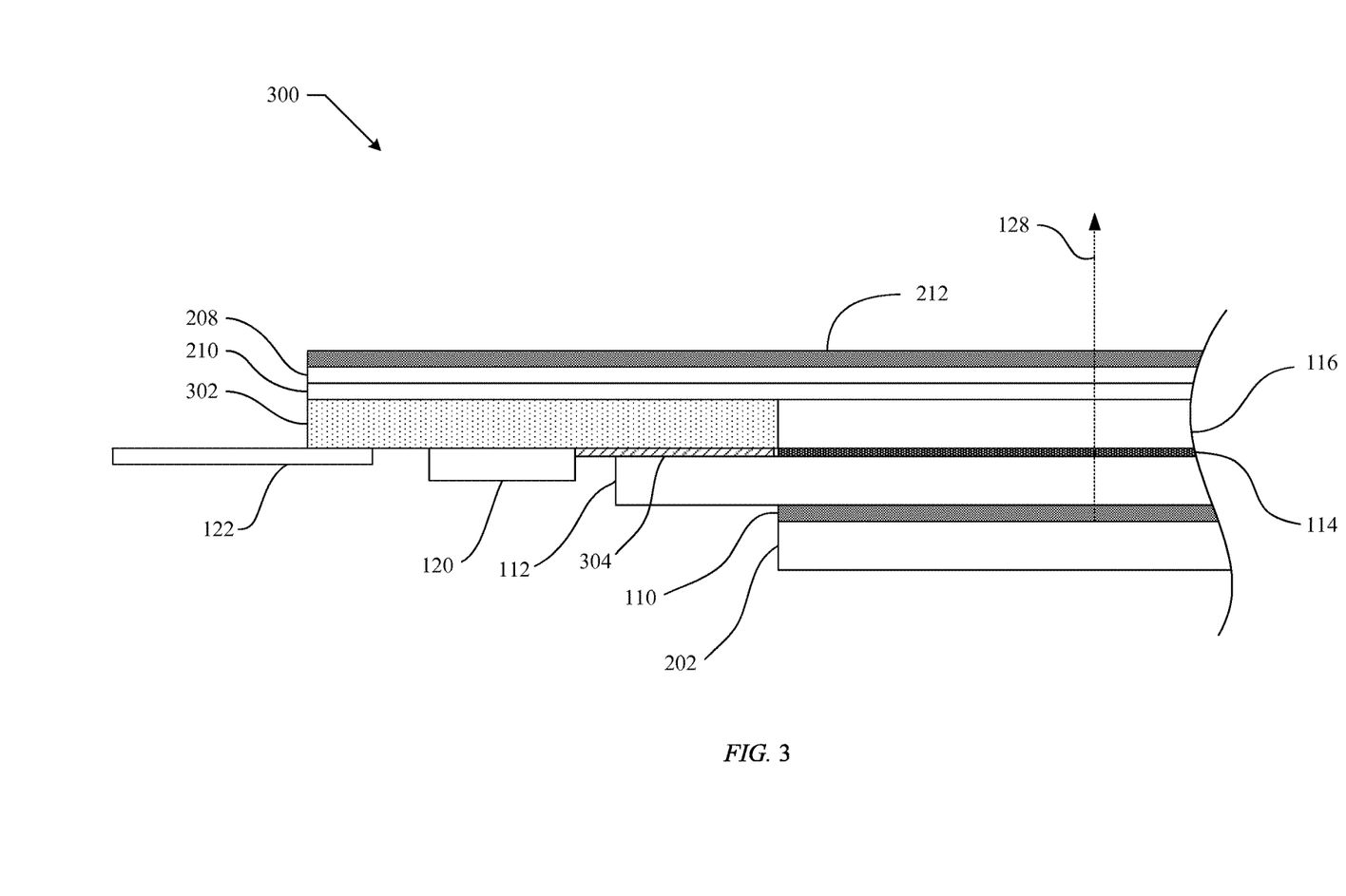
FIG. 3 shows a cross section of an LCD module where a thin layer of cover glass is supported over the TFT ledge using a glass spacer circuit.

FIG. 3 shows a cross-sectional view of LCD module 300 in which an alternative method of supporting a cover glass layer utilizing glass spacer circuit 302 is described. LCD module 300 can include backlight assembly 202, bottom polarizer 110, TFT glass layer 112, liquid crystal layer 114, and CF glass layer 116. Moreover, LCD module 300 can include cover glass layer 208 between CF glass layer 116 and top polarizer 212 similar to LCD module 200. However, cover glass layer 208 can be supported by glass spacer circuit 302 as opposed to foam and filler material. Furthermore, COG 120 and flexible printed circuit 122 are overlaid on the lower surface of glass spacer circuit 302 instead of TFT glass layer 112. Metal traces can be provided on glass spacer circuit 302 where it makes contact with TFT glass layer 112 to allow signals to be passed from flexible printed circuit 122 and COG 120 to TFT glass layer 112. Glass spacer circuit 302 can be bonded to TFT glass layer 112 using anisotropic conductive film (ACF) 304 or any other suitable conductive adhesive. When properly sized, the upper surface of glass spacer circuit 302 can align with the upper surface of CF glass layer 116. This can provide a uniform planar surface for bonding cover glass 208 using optically clear adhesive (OCA) 210. As a result, cover glass 208 can extend to an edge of LCD module 300 while being fully supported by glass spacer circuit 302. In other words, glass spacer circuit 302 can mechanically support cover glass 208 up to the edge of LCD module 300.

Figure 4:
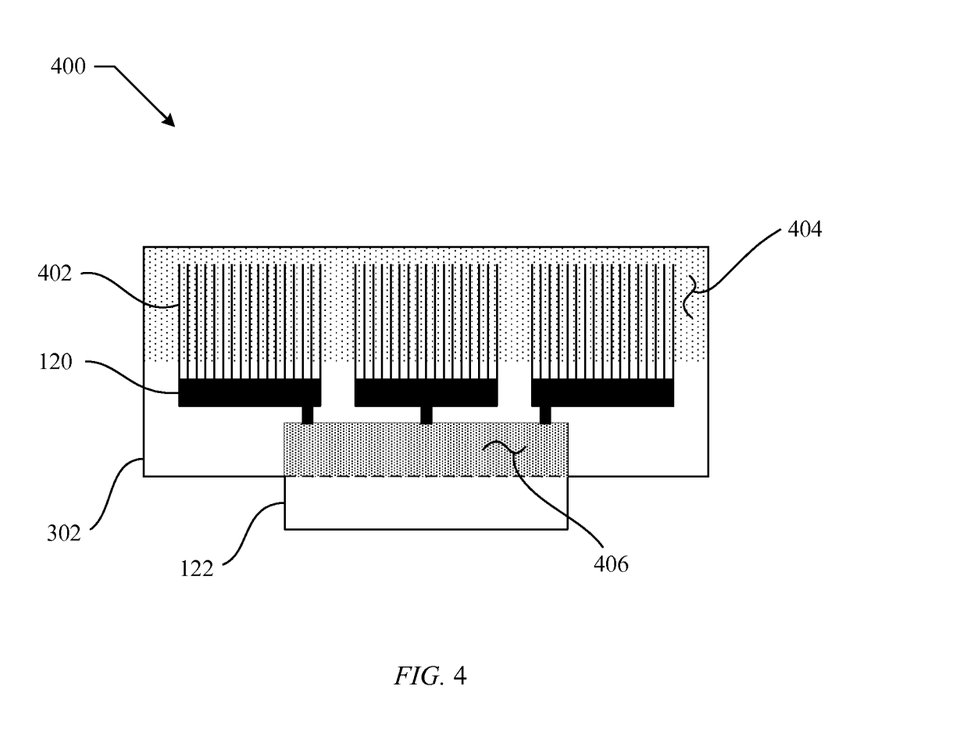
FIG. 4 shows a plan view of a glass spacer circuit that can be used to support a thin cover glass layer.

FIG. 4 shows a plan view of a glass spacer circuit assembly 400 that can be included in LCD module 300. COG 120 and metal traces 402 can be ACF bonded to glass spacer circuit 302 prior to being included in LCD module 300. Moreover, the underside of flexible printed circuit 122 can be ACF bonded to glass spacer circuit 302 in region 406. Flexible printed circuit 122 is a connector used to couple COG 120 to the circuit board. After assembly, glass spacer circuit assembly 400 can be rotated such that the surface with COG 120 is pointed downwards and can be ACF bonded to TFT glass layer 112 in region 404. Metal traces 402 can be aligned with corresponding traces on TFT layer 112 so signals from COG 120 can be transmitted to the appropriate circuitry on TFT layer 112.

Figure 5:
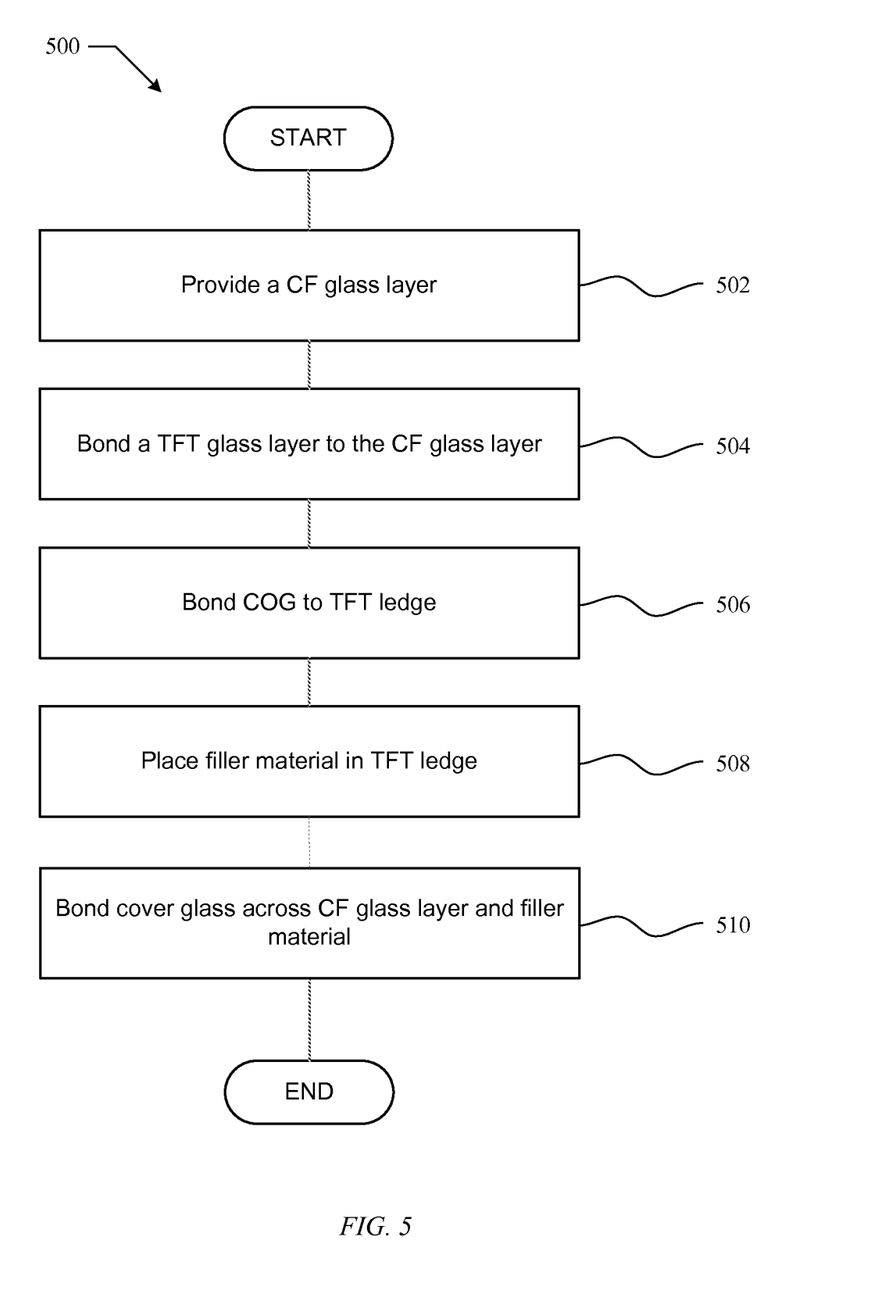
FIG. 5 describes a method for extending a glass portion of a display to an edge of a display housing foam and filler material.

FIG. 5 shows a flow chart describing process 500 in accordance with the described embodiments. In process 500, a method for extending a glass portion of a display to an edge of a display housing foam and filler material is disclosed. In step 502, a glass substrate overlaid with a color filter can be provided. In step 504, a TFT glass layer can be provided and bonded to a lower surface of the CF glass layer. The TFT glass layer can be larger than the CF glass layer and extend a distance past at least one edge of the CF glass layer. In step 506, COG can be bonded to an upper surface of an area created by the extension of the TFT glass layer past the edge of the CF glass layer, referred to as the TFT ledge. Next, in step 508, the TFT ledge can be filled with a filler material. In different embodiments of the disclosed process, various materials such as foam, glass, and adhesive filler can be used as filler material. The upper surface of the filler material can be configured such that it is coplanar with the upper surface of the CF glass layer. Finally, in step 510 a thin cover glass layer can be bonded across the upper surface of the CF glass layer and the filler material, extending to the edge of the LCD module. Steps 508 and 510 can be reversed depending on the filler material that is used. For example, an adhesive filler can be injected into the TFT ledge after the cover glass layer has been bonded in place.

Figure 6:
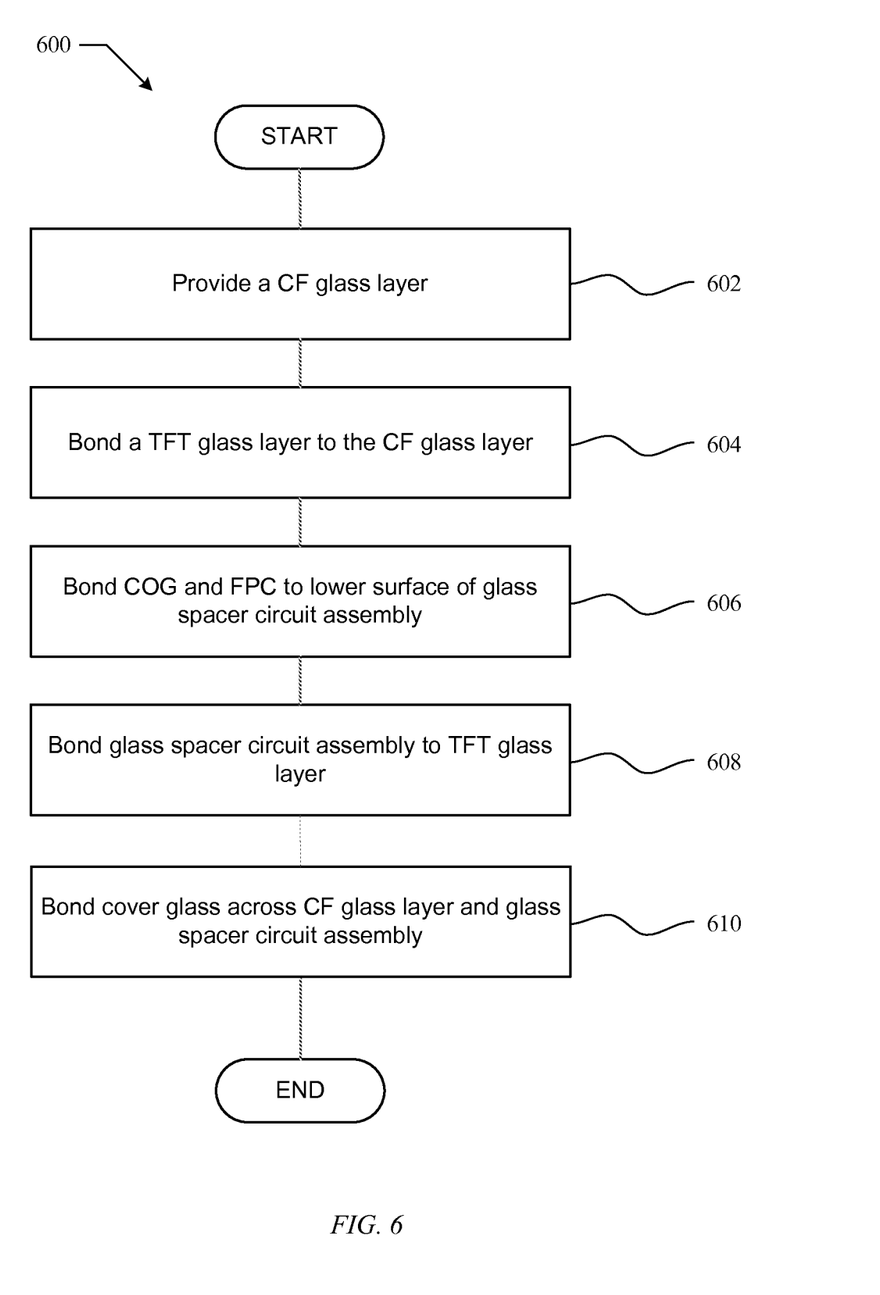
FIG. 6 describes a method for extending a glass portion of a display to an edge of a display housing a glass spacer circuit.

FIG. 6 shows a flow chart describing process 600 in accordance with the described embodiments. In process 600, a method for extending a glass portion of a display to an edge of a display housing a glass spacer circuit is disclosed. In step 602, a glass substrate overlaid with a color filter can be provided. In step 604, a TFT glass layer can be provided and bonded to a lower surface of the CF glass layer. The TFT glass layer can be larger than the CF glass layer and extend a distance past an edge of the CF glass layer. In step 606, chips on glass (COG) and flexible printed circuit (FPC) can be bonded to a lower surface of the glass spacer circuit assembly in an area that will not interfere with the bonding of the glass spacer circuit assembly to the TFT glass layer. In other words, the COG and FPC are bonded in an area that extends past an edge of the TFT glass layer, after the glass spacer circuit assembly has been bonded to the TFT glass layer. Next, in step 608, the lower surface of the glass spacer circuit assembly is bonded to an upper surface of the TFT glass layer, with an edge of the glass spacer circuit assembly abutting the edge of the CF glass layer. The glass spacer circuit assembly is configured to have a thickness so that the upper surface of CF glass layer is coplanar with the upper surface of glass spacer circuit assembly after bonding step 608. Finally, in step 610 a thin cover glass layer can be bonded across the upper surface of the CF glass layer and the upper surface of the glass spacer circuit assembly, extending to the edge of the LCD module.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A liquid crystal display (LCD) module with cover glass that extends to an edge of the LCD module, the LCD module comprising:
   a first glass substrate and a second glass substrate that is disposed below and in contact with the first glass substrate, the second glass substrate comprising a liquid crystal layer and extending past an edge of the first glass substrate;
   a cover glass layer disposed above the first glass substrate, the cover glass layer configured to extend over the edge of the first glass substrate and to the edge of the LCD module;
   at least one circuit coupled to an upper surface of the second glass substrate in an area extending past the edge of the first glass substrate;
   a filler material included in a cavity defined by a lower surface of the cover glass, an upper surface of the second glass substrate and the edge of the first glass substrate;
   a foam dam disposed in the cavity and adjacent to the filler material; the filler material and foam dam configured to fill the cavity, wherein the foam dam is made from an electromagnetic interference (EMI) shielding material;
   a polarizer layer extending past an edge of the first glass substrate and over the filler material and the second glass substrate; and
   a flexible printed circuit with at least a partially overlaid portion in the cavity on the upper surface of the second glass substrate;
   wherein the foam dam is disposed over the partially overlaid portion of the flexible printed circuit.

2. The LCD module as recited in claim 1, wherein the second glass substrate includes a thin film transistor (TFT) glass layer.

3. The LCD module as recited in claim 1, wherein the filler material includes glass.

4. The LCD module as recited in claim 2, wherein the foam dam is configured to resist a force of pressure from the cover glass layer.

5. The LCD module as recited in claim 1, wherein the filler material at least partially envelopes a chip on glass (COG) that includes a driver integrated circuit.

6. The LCD module as recited in claim 1, wherein the cover glass layer is laminated to the first glass substrate using an optically clear adhesive (OCA).

7. The LCD module as recited in claim 1, further comprising:
   an adhesive layer extending between the cover glass and the filler material.

8. The LCD module as recited in claim 7, wherein the cover glass extends between the polarizer layer and the adhesive layer.

9. A method for manufacturing a liquid crystal display (LCD) module with cover glass that extends to an edge of the LCD module, the method comprising:
   providing a first glass substrate overlaid with a color filter;
   bonding a second glass substrate to a lower surface of the first glass substrate, the second glass substrate comprising a liquid crystal layer and extending past an edge of the first glass substrate;
   bonding at least one circuit to an upper surface of the second glass substrate in an area extending past the edge of the first glass substrate;
   overlaying a portion of a flexible printed circuit on the upper surface of the second glass substrate;
   placing a filler material and a foam dam adjacent to the filler material in a cavity defined by a lower surface of the cover glass layer, the upper surface of the second glass substrate and the edge of the first glass substrate, wherein the filler material and the foam dam are configured to fill the cavity and wherein the foam dam is disposed over the overlaid portion of the flexible printed circuit;
   bonding the cover glass layer to the upper surface of the first glass substrate and the upper surface of the filler material; and
   attaching a polarizer layer to the cover glass layer, the polarizer layer configured to extend past an edge of the first glass substrate and over both the filler material and the second glass substrate.

10. The method as recited in claim 9, wherein the polarizing layer is laminated to the cover glass.

11. The method as recited in claim 9, wherein the second glass substrate includes a thin film transistor (TFT) glass layer.

12. The method as recited in claim 9, wherein bonding the cover glass layer to the upper surface of the first glass substrate and the upper surface of the filler material is performed using an optically clear adhesive (OCA).

13. The method as recited in claim 9, wherein the OCA extends between the cover glass and the filler material.

14. A liquid crystal display (LCD) module with cover glass that extends to an edge of the LCD module, the LCD module comprising:
   a first glass substrate and a second glass substrate that is disposed below and in contact with the first glass substrate, the second glass substrate comprising a liquid crystal layer and extending past an edge of the first glass substrate;
   a cover glass layer disposed above the first glass substrate, the cover glass layer configured to extend over the edge of the first glass substrate and to the edge of the LCD module;
   at least one circuit coupled to an upper surface of the second glass substrate in an area extending past the edge of the first glass substrate;
   a filler material included in a cavity defined by a lower surface of the cover glass, the upper surface of the second glass substrate and the edge of the first glass substrate;
   a foam dam disposed in the cavity and adjacent to the filler material, the filler material and foam dam configured to fill the cavity;
   a polarizer layer extending past an edge of the first glass substrate and over the filler material and the second glass substrate; and
   a flexible printed circuit with at least a partially overlaid portion in the cavity on the upper surface of the second glass substrate;

wherein the foam dam is disposed over the partially overlaid portion of the flexible printed circuit.

15. The LCD module as recited in claim 14, wherein the second glass substrate includes a thin film transistor (TFT) glass layer.

16. The LCD module as recited in claim 14, wherein the filler material includes glass.

17. The LCD module as recited in claim 14, wherein the foam dam is made from an electromagnetic interference (EMI) shielding material.

18. The LCD module as recited in claim 14, wherein the filler material at least partially envelops a chip on glass (COG) that includes a driver integrated circuit.

19. The LCD module as recited in claim 14, wherein the foam dam is shaped to cover a chip on glass (COG).

20. The LCD module as recited in claim 14, wherein the foam dam extends to the edge of the cover glass layer.

* * * * *

UNITED STATES PATENT AND TRADEMARK OFFICE
CERTIFICATE OF CORRECTION

PATENT NO. : 9,664,955 B2  Page 1 of 1
APPLICATION NO. : 13/965112
DATED : May 30, 2017
INVENTOR(S) : Eric Lee Benson et al.

It is certified that error appears in the above-identified patent and that said Letters Patent is hereby corrected as shown below:

On the Title Page

Item (60) Related U.S. Application Data:
Replace "Provisional application No. 61/694,194, filed Aug. 28, 2013;", with --Provisional application No. 61/694,194, filed on Aug. 28, 2012;--.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*